United States Patent [19]

Namiki

[11] Patent Number: 5,053,890
[45] Date of Patent: Oct. 1, 1991

[54] MAGNETIC RECORDING AND REPRODUCING APPARATUS

[75] Inventor: Yasuomi Namiki, Yokohama, Japan
[73] Assignee: Victor Company of Japan, Ltd., Yokohama, Japan
[21] Appl. No.: 352,469
[22] Filed: May 16, 1989
[30] Foreign Application Priority Data
  May 16, 1988 [JP] Japan ................ 63-116842
[51] Int. Cl.⁵ .......................... A04N 5/782
[52] U.S. Cl. .................... 360/19.1; 360/77.05; 360/77.14; 358/343
[58] Field of Search .......... 360/19.1, 27, 66, 77.05, 360/77.14, 84; 358/343; 369/95

[56] References Cited

U.S. PATENT DOCUMENTS

| | | | |
|---|---|---|---|
| 4,527,202 | 7/1985 | Ohta | 360/19.1 X |
| 4,533,961 | 8/1985 | Shibata et al. | 360/19.1 X |
| 4,607,293 | 8/1986 | Okada et al. | 360/19.1 X |
| 4,679,097 | 7/1987 | Tomita | 360/19.1 X |
| 4,821,132 | 4/1989 | Hasegawa | 360/84 X |

*Primary Examiner*—Roy N. Envall, Jr.
*Assistant Examiner*—Hung T. Dang
*Attorney, Agent, or Firm*—Fleit, Jacobson, Cohn, Price, Holman & Stern

[57] ABSTRACT

There is disclosed a magnetic recording and reproducing apparatus provided with a rotary drum wherein audio heads for recording/reproducing an audio signal, video heads for recording/reproducing a video signal, an erasing head for erasing recorded information are provided on the outer circumferential surface of the rotary drum, and a running magnetic tape is obliquely wound at a predetermined length on the outer circumferential surface. This apparatus is constituted so that, in an audio recording mode for recording the audio signal onto the tape by the audio heads, after a signal recorded on the tape is erased by the operation of the erasing head, the audio heads record onto the magnetic tape both signals of the audio signal and a control signal used for tracking servo at the time of reproducing operation, and that, in a video recording mode for recording the video signal at the surface layer portion of the tape by the video heads, the erasing head is inoperative, and, under the same state as the reproducing mode in which the servo system is synchronous with an input video signal, the video heads record the video signal at the surface layer portion of the tape of a track on which the audio signal has been recorded in the audio recording mode while carrying out tracking servo on the basis of the control signal reproduced from the tape.

3 Claims, 3 Drawing Sheets

| SW NO. | NAME | | a/b | SOUND RECORDING MODE | VIDEO RECORDING MODE | ORDINARY RECORDING MODE | INSERT RECORDING MODE | PLAYBACK MODE |
|---|---|---|---|---|---|---|---|---|
| SW 1 | Y SIGNAL MUTE | a | MUTE OFF | b (ON) | a (OFF) | a (OFF) | a (OFF) | b (ON) |
|  |  | b | MUTE ON |  |  |  |  |  |
| SW 2 | RECORDING LEVEL ADJUSTMENT CIRCUIT | a | NORMAL | b (LOW) | a (NORMAL) | a (NORMAL) | a (NORMAL) | b (LOW) |
|  |  | b | LOW |  |  |  |  |  |
| SW 3 | C SIGNAL MUTE | a | MUTE OFF | b (ON) | a (OFF) | a (OFF) | a (OFF) | b (ON) |
|  |  | b | MUTE ON |  |  |  |  |  |
| SW 4 | VIDEO SIGNAL RECORDING/PLAYBACK | a | RECORDING | a (RECORDING) | a (RECORDING) | a (RECORDING) | a (RECORDING) | b (PLAYBACK) |
|  |  | b | PLAYBACK |  |  |  |  |  |
| SW 5 | VIDEO HEAD RECORDING/PLAYBACK | a | RECORDING | a (RECORDING) | a (RECORDING) | a (RECORDING) | a (RECORDING) | b (PLAYBACK) |
|  |  | b | PLAYBACK |  |  |  |  |  |
| SW 6 | OSCILLATOR FOR ROTARY ERASING HEAD | a | ON | a (ON) | b (OFF) | a (ON) | a (ON) | b (OFF) |
|  |  | b | OFF |  |  |  |  |  |
| SW 7 | AUDIO SIGNAL RECORDING/PLAYBACK | a | RECORDING | a (RECORDING) | b (PLAYBACK) | a (RECORDING) | a (RECORDING) | b (PLAYBACK) |
|  |  | b | PLAYBACK |  |  |  |  |  |
| SW 8 | AUDIO HEAD RECORDING/PLAYBACK | a | RECORDING | a (RECORDING) | b (PLAYBACK) | a (RECORDING) | b (PLAYBACK) | b (PLAYBACK) |
|  |  | b | PLAYBACK |  |  |  |  |  |
| SW 9 | CONTROL HEAD & SERVO RECORDING/PLAYBACK | a | RECORDING | a (RECORDING) | b (PLAYBACK) | a (RECORDING) | b (PLAYBACK) | b (PLAYBACK) |
|  |  | b | PLAYBACK |  |  |  |  |  |
| SW 10 | DRUM REFERENCE SIGNAL | a | INPUT SYNC | b (EXTERNAL) | a (INT. OSC.) | a (INPUT SYNC) | a (INPUT SYNC) | b (INT. OSC.) |
|  |  | b | INTERNAL OSCILLATOR |  |  |  |  |  |

FIG. 3

MAGNETIC RECORDING AND REPRODUCING APPARATUS

BACKGROUND OF THE INVENTION

This invention relates to a magnetic recording and reproducing apparatus, and more particularly to a magnetic recording and reproducing apparatus to record an audio signal and a video signal which are superimposed on the same track of a magnetic tape by means of rotary heads to reproduce them therefrom.

At present, in the magnetic recording and reproducing apparatus of the helical scan system using a magnetic tape ½ inch wide, e.g., Video Tape Recorder (VTR), etc., rotary heads are mounted at positions opposite to each other on the rotating surface of the rotary body such as a rotary drum to run the magnetic tape obliquely wound over an angular range of, e.g., 180 degrees or slightly more onto the rotary body to record the video signal onto the magnetic tape by means of the rotary heads and to record the audio signal thereonto by means of a fixed head provided in the middle of the tape running path, and, at the time of playback or reproduction, to reproduce therefrom the video signal by means of the rotary heads and to reproduce therefrom the audio signal by means of the fixed head.

Further, there has been known such a VTR to superimpose the audio signal and the video signal on the same track formed on the tape and record them in order to effect high fidelity recording/reproducing of the audio signal.

However, in the case of attempting to record only the audio signal onto the tape by means of the rotary heads in the VTR (VTR I) adapted to effect recording/reproducing of the above-mentioned audio signal by means of the rotary heads, when the video signal has been input, this video signal was also recorded onto the tape as in the case of the ordinary recording, thus failing to record only the audio signal. Further, when the audio signal is reproduced after it has been recorded at the deep layer portion even if no video signal has been input, a single frequency-modulated carier signal such that it provides black level when reproduced would be recorded at the surface layer portion of the tape at the optimum recording level in that frequency, failing to record only the audio signal onto the tape.

On the other hand, in the case of attempting to record only the video signal onto the tape by means of the rotary heads, when recording is conducted with a VTR (VTR II) having only a function to effect recording/reproducing of the audio signal by means of the fixed head, only the video signal can be recorded onto the tape by means of the rotary heads.

Further, when there is employed a VTR (VTR III) provided with a switch for switching between execution and non-execution of recording of the audio signal by means of the rotary heads, this switch is used to make a switching such that, recording of the audio signal is not executed by means of the rotary heads, thereby making it possible to record only the video signal onto the tape by means of the rotary heads.

It is, however, to be noted that the rotary erasing head becomes operative in the same manner as at the time of the ordinary recording of the video signal and the audio signal, so signals recorded on the tape are erased by the rotary erasing head.

In the case of attempting to first record only the audio signal by the rotary heads using the conventional VTRs I, II and III thereafter to record the video signal onto the same magnetic tape by means of the rotary heads, for example, there is employed a method to use the above-mentioned VTR I to record only the audio signal by means of the rotary heads without inputting the video signal (a single frequency-modulated carrier signal such that it becomes black level when reproduced is also recorded), thereafter to use the above-mentioned VTR II to record the video signal by means of the rotary heads without erasing by the erasing head in the insert recording mode onto the track on which the previously-mentioned single frequency-modulated carrier signal is recorded such that it becomes black level when reproduced of the same magnetic tape in a manner that the video signal is superimposed on the single frequency-modulated carrier signal, thus making it possible to record only the audio signal by means of the rotary heads thereafter to record the video signal onto the same magnetic tape by means of the rotary heads.

For an alternative method of effecting such a recording as stated above, there may be employed an approach to first record only the audio signal by means of the rotary heads without inputting the video signal using the above-mentioned VTR I, thereafter to use the above-mentioned VTR III to make a switching of the switch so that recording of the audio signal by the rotary heads is not executed on the same magnetic tape, thus to record only the video signal onto the tape by means of the rotary heads.

In the case of the former method, there is no problem in connection with the audio signal recorded by means of the rotary heads, but there are problems of color moire and beat, etc. in connection with the video signal, because the video signal is recorded onto the track on which the single frequency-modulated carrier signal such that it becomes black level when reproduced is recorded, without erasing by the erasing head in the insert recording mode, in a manner that the video signal is superimposed on the single frequency-modulated carrier signal In addition, in the case of the latter method, when recording is conducted using VTR III, the rotary erasing head becomes operative, so that the audio signal having been previously recorded by the rotary erasing head would be erased.

Anyway, when an attempt is made to first only the audio signal by means of the rotary heads thereafter to record the video signal onto the track on which the audio signal is recorded by means of the rotary heads in a manner that the video signal is superimposed on the audio signal, the audio signal and the video signal cannot be precisely recorded with the conventional VTRs.

SUMMARY OF THE INVENTION

An object of this invention is to provide a magnetic recording and reproducing apparatus which has solved the above-mentioned problems with the prior arts, and which is adapted to first record the audio signal by means of the rotary audio head thereafter to record the video signal onto the same magnetic tape by means of the rotary video head, and makes it possible to normally record these signals.

To achieve this object, a magnetic recording and reproducing apparatus according to this invention comprises an arrangement such that a rotary audio head for recording/reproducing an audio signal, a rotary video head for recording/reproducing a video signal, and a rotary erasing head are provided on the rotating surface of a rotary body on which a running magnetic tape is obliquely wound over a predetermined angular range, respectively, the apparatus having an audio recording mode for recording the audio signal onto the magnetic tape by means of the rotary audio head, and a video recording mode for recording the video signal by means of the rotary video head at the surface layer portion of the magnetic tape of a track on which the audio signal is recorded, wherein, at the time of reproduction or playback, the apparatus is adapted to obtain a reproduced audio signal and a reproduced video signal from reproduced signals obtained by reproducing by means of the rotary audio head and the rotary video head, the audio signal and the video signal recorded on the magnetic tape, the apparatus being adapted, in the audio recording mode, to allow the rotary erasing head to be operative to erase the signal recorded on the magnetic tape by the rotary erasing head, thereafter to record an audio signal and a control signal used for tracking servo at the time of reproduction or playback, the apparatus being adapted, in the video recording mode, to allow the rotary erasing head to be inoperative to place the servo system in a reproducing state synchronous with an input video signal, thus to record the video signal at the surface layer portion of the magnetic tape of a track for the audio signal on which the video signal is recorded in the audio recording mode while effecting tracking servo by the control signal reproduced from the magnetic tape.

This invention is further characterized in that a scheme is employed in the audio recording mode to record the audio signal onto the magnetic tape by means of the rotary audio head, thereafter to record by means of the rotary heads video head a single frequency signal at the surface layer portion of the magnetic tape at a value lower than the optimum recording current in the frequency of the single frequency signal.

This invention is furthermore characterized in that supply of a recording current to the rotary video head is stopped in the audio recording mode.

In accordance with the magnetic recording and reproducing apparatus thus constituted, the audio signal can be recorded onto the magnetic tape by means of the rotary audio head in the audio recording mode, and the video signal can be recorded by the rotary video head at the surface layer portion of the magnetic tape of a track on which the audio signal has been recorded in the audio recording mode. In addition, these signals can be normally recorded.

Further, since a scheme is employed in the audio recording mode to record the single frequency signal at a value lower than the optimum recording current in that frequency by means of the rotary video head, or to stop supply of the recording current to the rotary video head, even if the video signal is recorded in the video recording mode at the surface portion of the magnetic tape of a track on which the audio signal is recorded, no beat interference occurs.

BRIEF DESCRIPTION OF THE DRAWINGS

In the accompanying drawings:

FIG. 3 is a chart for explaining the changeover operation of switches in the apparatus shown in FIG. 1.

DETAILED DESCRIPTION OF THE PREFERRED EMBODIMENT

An embodiment of a magnetic recording and reproducing apparatus according to this invention will be described with reference to the attached drawings.

Figure 1:
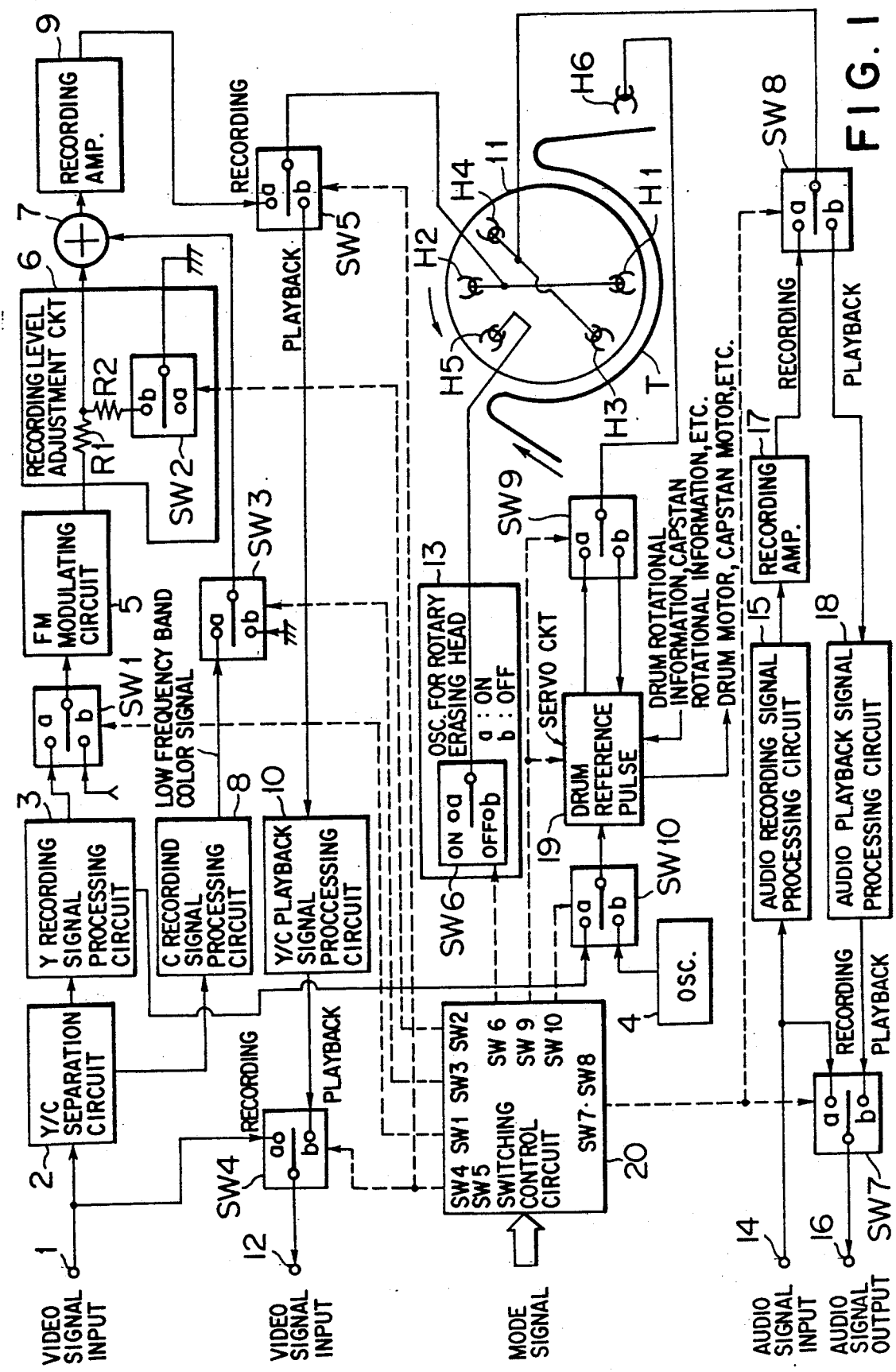
FIG. 1 is a block diagram showing an embodiment of a magnetic recording and reproducing apparatus according to this invention.

FIG. 1 is a block diagram showing an embodiment of a magnetic recording and reproducing apparatus according to this invention.

Referring to this figure, a video signal is input to a video signal input terminal 1, and this video signal is delivered to a Y/C separation circuit 2 and to the terminal a of a switch SW4.

The switch SW4 is switched to the terminal a at the time of recording. Thus, the video signal (recording signal) from the input terminal 1 is output from a video signal output terminal 12. Further, this switch SW4 is switched to the terminal b at the time of playback. Thus, an output from a Y/C playback signal processing circuit 10 is output from the video signal output terminal 12.

The video signal delivered to the Y/C separation circuit 2 is separated into a luminance signal Y and a color signal C thereat. The luminance signal Y thus separated is delivered to a Y recording signal processing circuit 3, at which a predetermined signal processing is implemented thereto. The luminance signal thus processed is then delivered to the terminal a of a switch SW1. At the Y signal processing circuit 3, a synchronizing signal is separated from the luminance signal Y input thereto. The synchronizing signal thus obtained is delivered to the terminal a of a switch SW10.

Additionally, a direct current (DC) level signal is delivered to the terminal b of the switch SW1, and an oscillating output from an oscillator 4 is delivered to the terminal b of the switch SW10.

An output from the switch SW1 is delivered to a FM modulating circuit 5, at which it is subjected to frequency modulation. The frequency modulated output is then delivered to one input terminal of an adder 7 through a recording level adjustment circuit 6.

The recording level adjustment circuit 6 comprises a resistor $R_1$ connected between the input terminal and the output terminal, a resistor $R_2$ connected between one end of the resistor $R_1$ and ground, and a switch SW2 for switching between connection and no connection of the resistor $R_2$.

In this example, the resistor $R_2$ is in a connected state when the switch SW2 is switched to the terminal b, and is in a no connected state when switched to the terminal a.

On the other hand, color signal C separated at the Y/C separation circuit 2 is delivered to a C recording signal processing circuit 8, at which a predetermined signal processing is implemented thereto. The low-frequency band color signal obtained by this processing is then delivered to the terminal a of the switch SW3.

The terminal b of a switch SW3 is grounded.

An output from the switch SW3 is delivered to the other input terminal of the adder 7.

After an output from the adder 7 is amplified by a recording amplifier 9, it is delivered to the terminal a (recording side) of a switch SW5. An output from the terminal b (reproducing side) of the switch SW5 is delivered to the terminal b of the switch SW4 through the Y/C playback signal processing circuit 10.

At the time of recording, the switch SW5 is switched to the terminal a. A recording signal from the recording amplifier 9 is delivered to rotary video heads $H_1$ and $H_2$ provided at opposite positions on the rotating surface of the rotary drum 11. Thus, the recording signal is recorded onto the magnetic tape T wound onto the rotary drum 11. In addition, at the time of playback or reproduction, the switch SW5 is switched to the terminal b. Thus, a signal reproduced from the magnetic tape T by means of rotary video heads $H_1$ and $H_2$ is delivered to the Y/C playback signal processing circuit 10.

On the rotating surface of the rotary drum 11, in addition to the rotary video heads $H_1$ and $H_2$ for recording/reproducing the video signal, rotary audio heads $H_3$ and $H_4$ for recording/reproducing the audio signal are provided at the opposite positions so as to have a positional relationship such that the rotary audio heads $H_3$ and $H_4$ precede the rotary video heads $H_1$ and $H_2$ (namely, after one of the audio heads $H_3$ and $H_4$ traces a track on the magnetic tape, one of the video heads $H_1$ and $H_2$ traces that track), and a rotary erasing head $H_5$ is further provided.

To the rotary erasing head $H_5$, an oscillating output from an oscillator 13 for rotary erasing head is delivered. When a switch SW6 is in on state such that it is switched to the terminal a, the oscillator 13 for rotary erasing head effects oscillating operation. As a result, the oscillating output is delivered to the rotary erasing head $H_5$. Thus, erasing by the rotary erasing head $H_5$ is carried out (operative state).

In contrast, when the switch SW6 is an off state such that it is switched to the terminal b, the oscillator 13 for rotary erasing head does not effect oscillating operation. As a result, the oscillating output is not delivered to the rotary erasing head $H_5$. Thus, erasing by the rotary erasing head $H_5$ is not carried out (inoperative state).

On the other hand, an audio signal is input to an audio signal input terminal 14. The audio signal thus input is delivered to an audio recording signal processing circuit 15, and is also delivered to the terminal a of a switch SW7.

The switch SW7 is switched to the terminal a at the time of recording. Thus, the audio signal (recording signal) from the input terminal 14 is output from an audio signal output terminal 16. Further, the switch SW7 is switched to the terminal b at the time of playback or reproduction. Thus, an output from an audio playback processing circuit 18 is output from the audio signal output terminal 16.

After the audio signal from the input terminal 14 is subjected to a predetermined signal processing at the audio recording signal processing circuit 15, it is amplified at a recording amplifier 17, and is then delivered to the terminal a (recording side) of a switch 8. An output from the terminal b (reproducing side) of the switch 8 is delivered to the terminal b of the switch 7 through the audio playback signal processing circuit 18.

The switch 8 is switched to the terminal a at the time of recording. Thus, an audio recording signal from the recording amplifier 17 is delivered to the rotary audio heads $H_3$ and $H_4$ provided at opposite positions on the rotating surface of the rotary drum 11, and is then recorded onto the magnetic tape T wound on the rotary drum 11. Further, the switch 8 is switched to the terminal b at the time of playback or reproduction. Thus, signals reproduced from the magnetic tape T by the rotary audio heads $H_3$ and $H_4$ are delivered to the audio playback signal processing circuit 18.

A servo circuit 19, carries out a rotational control (servo) of the drum motor and the capstan motor (not shown) on the basis of a drum reference pulse from the switch SW10, the drum rotational information, and the capstan rotational information, etc., and effects recording/reproducing of the control signal by a fixed control head $H_6$ through a switch SW9.

A switch control circuit 20 responds to a mode signal ("Hi" or "Lo") input thereto to deliver to the switches SW1 to SW10 switching control signals for switching the switches SW1 to SW10 to the terminal a or the terminal b, respectively.

Although particularly not shown in FIG. 1, a switching control signal delivered from the switch control circuit 10 to the switch SW4 is delivered also to the Y recording signal processing circuit 3, the C recording signal processing circuit 8, and the Y/C playback signal processing circuit 10. Thus, switching of each power supply, etc. is controlled. Similarly, a switching control signal delivered from the switch control circuit 20 to the switch SW7 is delivered also to the audio recording signal processing circuit 15 and the audio playback signal processing circuit 18.

Figure 2:
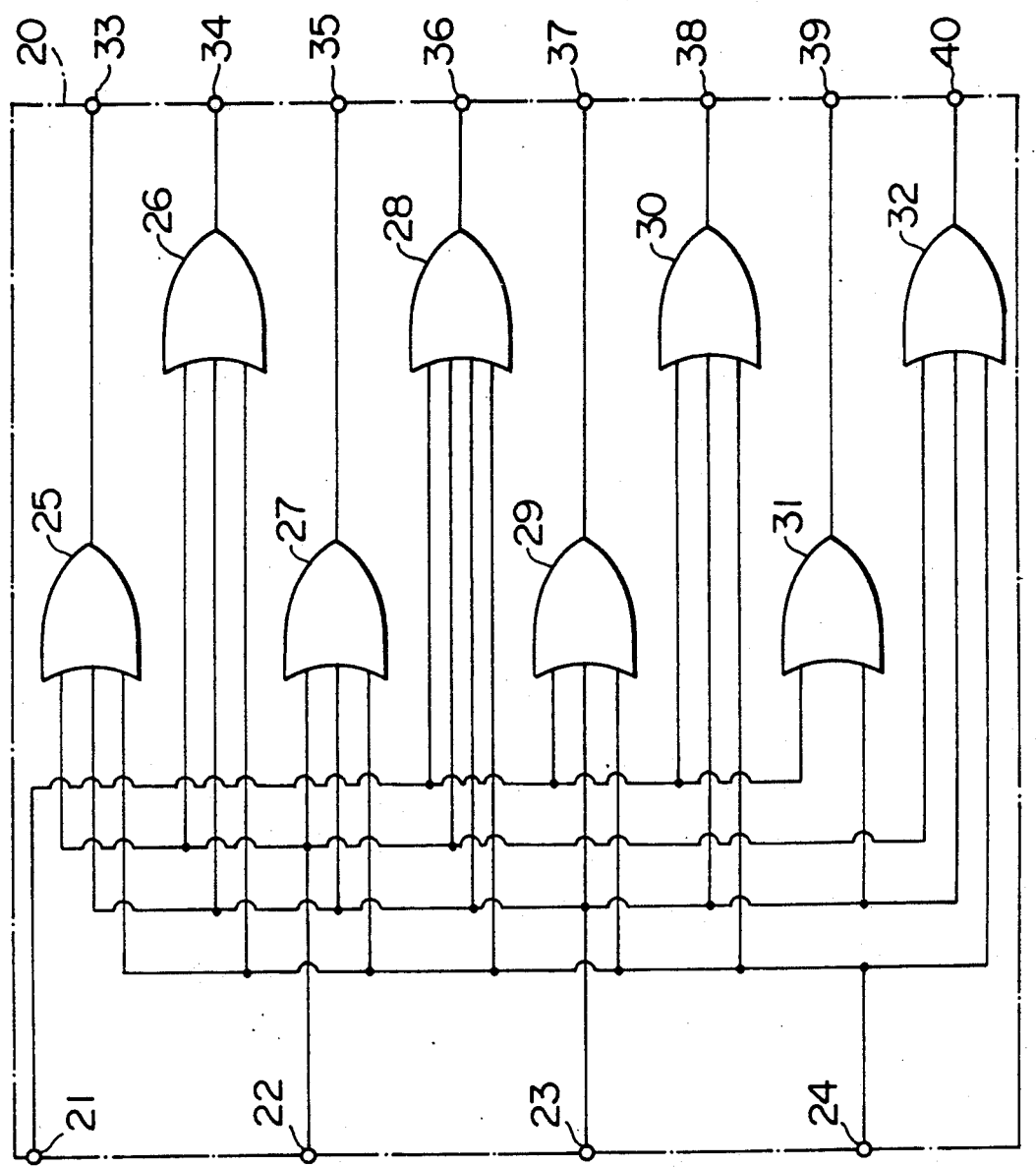
FIG. 2 is a logic circuit diagram showing an actual configuration of a switch control circuit provided in the apparatus of the embodiment shown in FIG. 1.

FIG. 2 is a logic circuit diagram showing an example of the actual configuration of the switch control circuit 20, and FIG. 3 is a Table showing the names of the switches SW1 to SW10 and the switching relationships corresponding to respective modes.

Referring to FIG. 2, an audio recording mode terminal 21 is connected to each input terminal of OR circuits 28, 29, 30 and 31. A video recording mode terminal 22 is connected to each input terminal of OR circuits 25, 26, 27, 28 and 32. An ordinary recording mode terminal 23 is connected to each input terminal of OR circuits 25, 26, 27, 28, 29, 30, 31 and 32. In addition, an insert recording mode terminal 24 is connected to each input terminal of OR circuits 25, 26, 27, 28, 29, 30 and 32.

An output of the OR circuit 25 is connected to the switch SW1 through an output terminal 33, an output of the OR circuit 26 is connected to the switch SW2 through an output terminal 34, an output of the OR circuit 27 is connected to the switch SW3 through an output terminal 35, an output of the OR circuit 28 is connected to the switches SW4 and SW5 through an output terminal 36, an output of the OR circuit 29 is connected to the switch SW6 through an output terminal 37, an output of the OR circuit 30 is connected to the switches SW7 and SW8 through an output terminal 38, an output of the OR circuit 31 is connected to the switch SW9 through an output terminal 39, and an output of the OR circuit 32 is connected to the switch SW10 through an output terminal 40.

In the cases of "Audio recording mode", "Video recording mode", "Ordinary recording mode" and "Insert recording mode", a signal of "Hi" is delivered only to a terminal corresponding to a mode selected (any one of terminals 21 to 24). In the case of "Reproducing mode", a signal of "Lo" is delivered to each of the terminals 21 to 24.

In accordance with a signal or signals of "Hi" or "Lo" delivered to terminals 21 to 24, signals of "Hi" or "Lo" are output to output terminals 33 to 40. By these outputs, switches SW1 to SW10 respectively connected to output terminals 33 to 40 are switched. When a signal of "Hi" is output, switches connected thereto are switched to the side, and when a signal of "Lo" is output, switches connected thereto the b side.

The switching operation of switches SW1 to SW10 in respective modes will be described with reference to FIG. 3.

Initially, "Audio recording mode" for recording the audio signal onto the magnetic tape by means of rotary audio heads $H_3$ and $H_4$ will be described.

In the "Audio recording mode", switch SW1 (Y signal mute changeover switch) is switched to the terminal b, so luminance signal Y is eliminated (muted). Thus, a DC level signal is delivered as an input signal of the FM modulating circuit 5. For this reason, a single frequency-modulated carrier signal is output from the FM modulating circuit 5.

Though the DC level signal may be of any level so long as it is within the level range of the luminance signal input to the FM modulating circuit 5 in the ordinary recording mode, it is preferably set between the sync tip and the pedestal level of the luminance signal.

The switch SW2 (recording level adjustment circuit changeover switch) is switched to the terminal b. Thus, the recording level of the single frequency-modulated carrier signal output from the FM modulating circuit 5 is lowered, e.g., by about 8 dB as compared to the optimum recording level in that frequency.

The switch SW3 (C signal mute changeover switch) is switched to the terminal b, so the color signal C which has been changed to a low frequency band signal is muted.

The switch SW4 (video signal recording/playback changeover switch) and the switch SW5 (video head recording/playback changeover switch) is switched to the terminal a (recording side). Even if a video signal is input from the input terminal 1, only the single frequency-modulated carrier signal of low level is delivered to the rotary video heads $H_1$ and $H_2$ at the time Of "Audio recording mode".

The switch SW6 (oscillator changeover switch for rotary heads erasing head) is switched to the terminal a and is turned on. At this time, the oscillator 13 for rotary erasing head carries out the oscillating operation. As a result, the oscillating output is delivered to the rotary erasing head $H_5$, whereby erasing by the rotary erasing head $H_5$ is carried out (operative state).

The switch SW7 (audio signal recording/playback changeover switch) and the switch SW8 (audio head recording/playback changeover switch) is switched to the terminal a (recording side), resulting in the recording mode.

The switch SW9 (control head and servo recording/playback changeover switch) is switched to the terminal (recording side). As a result, the servo system shifts to the recording mode. Thus, a control signal is recorded onto the magnetic tape T by the control head $H_6$.

In addition, since there is the possibility that no video signal is input at the time of "Audio recording mode", the switch SW10 (a drum reference pulse changeover switch) is switched to the terminal b. Thus, an oscillating output from the internal oscillator 4 will be delivered as the drum reference pulse for the servo circuit 19.

When a magnetic tape having been recorded in the "Audio recording mode" in a manner stated above is reproduced, a single frequency-modulated carrier signal as the video signal is reproduced although it is a signal of low level. Accordingly, an application of FM demodulating to such a signal results in a DC level signal.

Thus, the entire screen is filled with black by the function of a clamper in the color television receiver (as a monitor device).

The apparatus of this invention provides the same reproduced picture as that in the case of reproducing the magnetic tape which is ordinarily recorded without inputting the video signal by the above-mentioned conventional VTR I, but can offer the following merits.

(1) There is no need to employ a method in which any video signal is not input.

(2) Since the signal recorded as a video signal is of low level, it is not recorded down to the deep layer portion of the magnetic tape, and is therefore easily erased. Even in the case where the video signal is superimposed and recorded by "Video recording mode" which will be referred to later, there is little possibility that beat interference might occur.

(3) In the case of using this apparatus only in "Audio recording mode", since the degree of erasing of the audio signal by the superimpose-recording of the signal as the video signal is small, the S/N ratio of the audio signal is improved.

When there is employed a method in which neither a single frequency-modulated carrier signal of low level as stated above nor any recording signal is delivered to the rotary video heads $H_1$ and $H_2$ at the time of the "Audio recording mode", thus to conduct recording onto a magnetic tape, thereafter to superimpose and record the video signal onto the magnetic tape by "Video recording mode", recording can be conducted such that any beat interference is not produced in the same manner as in the case of superimposing and recording the video signal at the surface layer portion of the magnetic tape of a track for the audio signal by means of the rotary heads using the ordinary VTR.

"Video recording mode" for superimposing (overwriting) and recording a video signal at the surface layer portion of a magnetic tape of a track on which an audio signal has been recorded in the above-mentioned "Audio recording mode" by means of rotary video heads $H_1$ and $H_2$ will be now described.

At the time of "Video recording mode", switches SW1 to SW5 are switched to the terminal a, which is the same state as that at the time of "Ordinary recording mode". A signal in which a frequency-modulated luminance signal of an ordinary level and a low-frequency band color signal are subjected to frequency division multiplexing is delivered to rotary video heads $H_1$ and $H_2$, and is thus recorded at the surface layer portion of a magnetic tape of a track on which an audio signal has been recorded in "Audio recording mode".

The switch SW6 is switched to the terminal b and is turned off. At this time, the oscillator 13 for rotary erasing head does not carry out the oscillating operation. Thus, no oscillating output is delivered to the rotary erasing head $H_5$, so that erasing by the rotary erasing head $H_5$ is not carried out (inoperative state).

The switches SW7 and SW8 are switched to the terminal b (reproducing side), resulting in the playback or reproducing mode.

The switch SW9 is switched to the terminal b (reproducing side), so that servo system shifts to the playback mode. A control signal recorded on the magnetic tape T by the control head $H_6$ is thus reproduced. The capstan motor is subjected to rotational control (servo) so as to correctly effect tracking of the audio signal in synchronism with the rotary drum 11.

The switch SW10 is switched to the terminal Thus, a synchronizing signal separated from the input video signal is delivered as a drum reference pulse for the servo circuit 19.

Namely, at the time of "Video recording mode", a control is performed to carry out switching of the switches SW9 and SW10 to effect a rotational control of the rotary drum 11 in synchronism with the synchronizing signal separated from the input video signal, and to carry out rotational control (servo) of the capstan motor so that the control signal is reproduced at a correct timing with respect to the drum rotational or angular phase and the audio signal is correctly subjected to tracking, thus to control the tape running.

In a manner described above, in "Video recording mode", the video signal can be superimposed and recorded at the magnetic surface layer portion of a track on which the audio signal has been recorded in "Audio recording mode" while effecting tracking servo by the control signal reproduced from the magnetic tape. Such a control system as stated above provides the following merits.

(1) It is possible to cause the rotary audio heads H3 and H4 correctly trace at the same position as that of the recorded audio signal track.

(2) The video signal can be recorded under condition where it is superimposed on the above-mentioned audio signal track. In addition, the video signal can be recorded at a correct timing such that each rotary video head is switched at time points corresponding to those outside the screen.

(3) Since the rotary erasing head becomes inoperative, the previously recorded audio signal is not erased.

(4) Since there is employed an arrangement such that rotary audio heads H3 and H4 and rotary video heads H1 and H2 are provided separately from each other, it is possible to record the video signal by the rotary video heads H1 and H2 while reproducing the audio signal by the rotary audio heads H3 and H4 (in the manner that recording of the video signal is conducted in harmony with reproduction of the audio signal).

At the time of "Ordinary recording mode", all the switches SW1 to SW10 are switched to the terminal a, and at the time of "Playback mode", all the switches SW1 to SW10 are switched to the terminal b. Further, at the time of "Insert recording mode", only the switch SW9 is switched to the terminal b and the other switches SW1 to SW8 and switch SW10 are all switched to the terminal a.

While an example of the actual configuration of the switch control circuit 20 in FIG. 1 is shown in FIG. 2, there may be instead employed a control circuit (microcomputer) adapted to execute program for effecting switching control of switches SW1 to SW10 so as to have a switching relationship as shown in FIG. 3 in dependence upon the input mode signal without constituting the above switching control circuit with hardware.

In the case where a single frequency-modulated carrier signal is recorded by the rotary video heads H1 and H2 in "Audio recording mode", by employing a scheme to characterize the single frequency-modulated carrier signal thus recorded so that it is discriminated by frequency, when reproducing a magnetic tape on which the single frequency-modulated carrier signal has been recorded, one can readily identify or judge that such a tape is a tape on which any picture by a video signal is not recorded, but an audio signal is recorded. In addition, such a judgement result may be displayed on the display unit of VTR, or may be displayed on the screen of a television receiver or a monitor device.

As described above, the magnetic recording and reproducing apparatus according to this invention can record the audio signal onto the magnetic tape by the rotary audio heads in the audio recording mode, and record the video signal, in the video recording mode, by the rotary video heads at the magnetic tape surface layer portion of a track on which the audio signal has been recorded at the time of the audio recording mode. Further, this apparatus can normally record these signals. In addition, since a method is employed in the audio recording mode to record by rotary video heads a single frequency signal at a value lower than the optimum recording current at that frequency, or stop supply of the recording current to the rotary video heads, even if a video signal is recorded in the video recording mode at the magnetic tape surface layer portion of a track on which an audio signal has been recorded, there is no possibility that any beat interference takes place.

What is claimed is:

1. A magnetic recording and reproducing apparatus having a fixed control head for recording/reproducing a control signal, said fixed control head being used for tracking servo at the time of reproducing operation, and provided with a rotary drum, an audio head for recording/reproducing an audio signal, a video head for recording/reproducing a video signal, and an erasing head for erasing recorded information being provided on the outer circumferential surface of said rotary drum, a running magnetic tape being obliquely wound at a predetermined length on said outer circumferential surface;

wherein, in an audio recording mode for recording said audio signal onto said tape by means of said audio head, after a signal recorded on said tape is erased by the operation of said erasing head, and said control head records onto said magnetic tape a control signal used for tracking servo at the time of reproducing operation; and wherein in a video recording mode for recording said video signal at the surface layer portion of said tape by means of said video head, said erasing head is inoperative, and under the same state as the reproducing mode in which the servo system is synchronous with an input video signal, said video head records said video signal at the surface layer portion of said tape of a track on which said audio signal has been recorded in said audio recording mode while carrying out tracking servo on the basis of said control signal reproduced from said tape by said control head.

2. A magnetic recording and reproducing apparatus as set forth in claim 1, wherein after said audio head has recorded onto said tape said audio signal in said audio recording mode, said video head records a single frequency signal at a value smaller than an optimum current in that frequency at said surface layer portion on said track on which said audio signal has been recorded, and a color signal ceases to be supplied to said video head.

3. A magnetic recording and reproducing apparatus as set forth in claim 1, comprising
a first switch which changes over an input video signal and a direct current for generating a fixed carrier frequency, and outputs a change-over output to a video signal frequency modulation circuit, a recording level adjustment circuit including a second switch which adjusts a recording level, a third switch for muting a low frequency band color signal for converting the video signal, thereby preventing an interface between the audio and video signals in a later video recording mode, and a switching control circuit for responding to an input mode signal and for outputting switching control signals for switching said first, second, and third switches.

* * * * *